United States Patent [19]

Avery

[11] 4,378,932

[45] Apr. 5, 1983

[54] PRESSURE RESPONSIVE VALVE ASSEMBLY

[75] Inventor: Alfred J. Avery, Flushing, Mich.

[73] Assignee: Good News Unlimited Incorporated, Dryden, Mich.

[21] Appl. No.: 284,543

[22] Filed: Jul. 20, 1981

[51] Int. Cl.³ .......................................... F16K 31/126
[52] U.S. Cl. .................................. 251/61.4; 251/285; 251/327
[58] Field of Search ................... 251/61.2, 61.4, 61.5, 251/63.6, 327, 285, 214

[56] References Cited

U.S. PATENT DOCUMENTS

| | | | |
|---|---|---|---|
| 2,001,318 | 5/1935 | Spence | 251/61.2 |
| 2,399,301 | 4/1946 | Spence | 251/61.2 |
| 2,425,284 | 8/1947 | Spence | 251/61.2 |
| 2,815,187 | 12/1957 | Hamer | 251/327 |
| 4,054,156 | 10/1977 | Benson | 251/63.6 |

Primary Examiner—George L. Walton
Attorney, Agent, or Firm—Gifford, VanOphem, Sheridan & Sprinkle

[57] ABSTRACT

A pressure responsive valve assembly which comprises a housing having an upper part and a lower part. A fluid coupling with an inlet and an outlet is contained in the lower housing part and a fluid passageway extends between and connects the inlet to the outlet. A gate is slidably mounted within the lower housing part and movable between a closed position in which the gate extends across the passageway and blocks fluid flow between the inlet and outlet, and an open position in which the gate opens at least a portion of the fluid passageway. The actuation of the gate is controlled by a pressure responsive diaphragm which permits the gate to move to its open position only when the pressure from an external pressure line falls below a predetermined amount.

4 Claims, 2 Drawing Figures

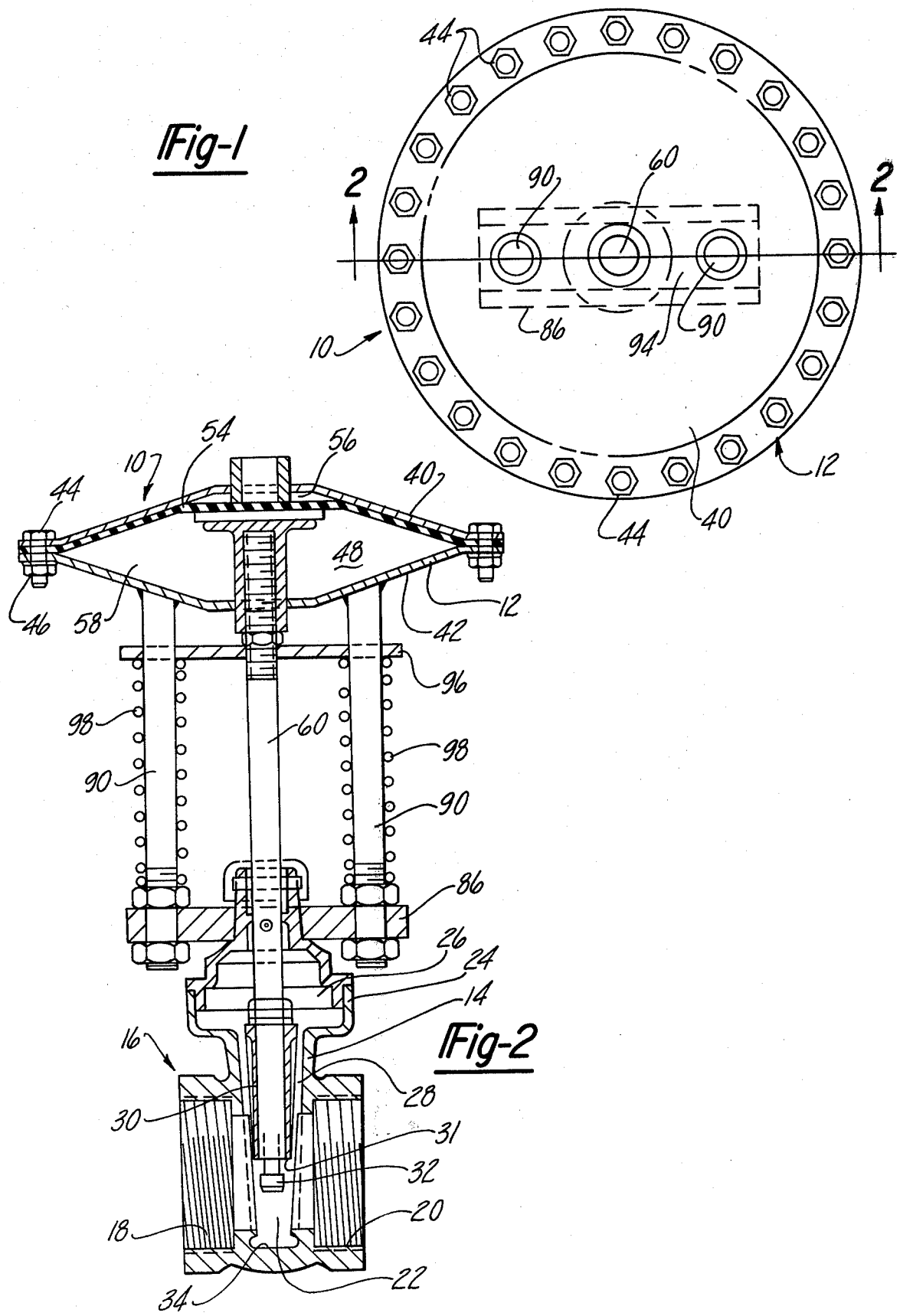

PRESSURE RESPONSIVE VALVE ASSEMBLY

BACKGROUND OF THE INVENTION

I. Field of the Invention

The present invention relates generally to valves and, more particularly, to a pressure responsive valve assembly.

II. Description of the Prior Art

There are a number of previously known valve assemblies and many of these previously known valve assemblies are actuated between an open and a closed position by an external pressure source. Such pressure responsive valves are used in a plurality of different applications.

One disadvantage of these previously known pressure responsive valves is that such valves are complex in construction and thus very expensive to manufacture. Furthermore, due in part to their complexity, these previously known pressure responsive valves are subject to frequency and expensive repair costs.

These previously known pressure responsive valves, furthermore, require frequent periodic maintenance and inspection to ensure the operability of the valve. Such maintenance is difficult and time-consuming to perform again due in part to the complexity of these valves.

SUMMARY OF THE PRESENT INVENTION

The present invention provides a pressure responsive valve assembly which overcomes the above mentioned disadvantages of the previously known pressure responsive valves.

In brief, the valve assembly according to the present invention comprises a housing having an upper part and a lower part. The lower housing part includes a fluid coupling having an inlet, an outlet and a fluid passageway extending therebetween.

A gate is slidably mounted in the lower housing part and is movable between an open and a closed position. In its closed position, the gate extends across the passageway and blocks fluid flow from the coupling inlet and to the coupling outlet. Conversely, in its open position, the gate is retracted radially away from the passageway so that at least a portion of the passageway between the inlet and outlet is opened.

The upper housing part forms a closed chamber in which a diaphragm is contained. An elongated rod is attached at one end to the gate and, at its other end, abuts against or is attached to one side of the diaphragm so that the rod, and thus the gate, move in unison with the movement of the diaphragm. The other side of the diaphragm is coupled to a pressure source.

Resilient means are disposed between the valve housing and the rod and urge the gate towards its open position while, conversely, the fluid pressure source acts against the resilient means and forces the gate to its closed position whenever the fluid pressure exceeds a predetermined amount. However, when the pressure at the pressure source falls below the predetermined amount, the resilient means move the gate to its open position.

Although the pressure responsive valve according to the present invention can be used in any number of different applications, in one application the coupling inlet is coupled to a source of waste water or sewage while the coupling outlet is connected to a waste water or sewage dump line. The pressure source, in turn, comprises the water pressure for fresh water. Thus, in operation, the gate will remain in its closed position as long as the fresh water pressure exceeds a predetermined pressure level. In the event that the fresh water pressure falls below the predetermined level, the gate automatically opens to discharge the sewage or waste water and thus eliminates the possibility of contamination of the fresh water supply.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is a top view illustrating a preferred embodiment of the valve assembly according to the present invention;

FIG. 2 is a longitudinal sectional view taken substantially along line 2—2 in FIG. 1 and illustrating the valve in its open position.

DETAILED DESCRIPTION OF A PREFERRED EMBODIMENT OF THE PRESENT INVENTION

Figure 3:
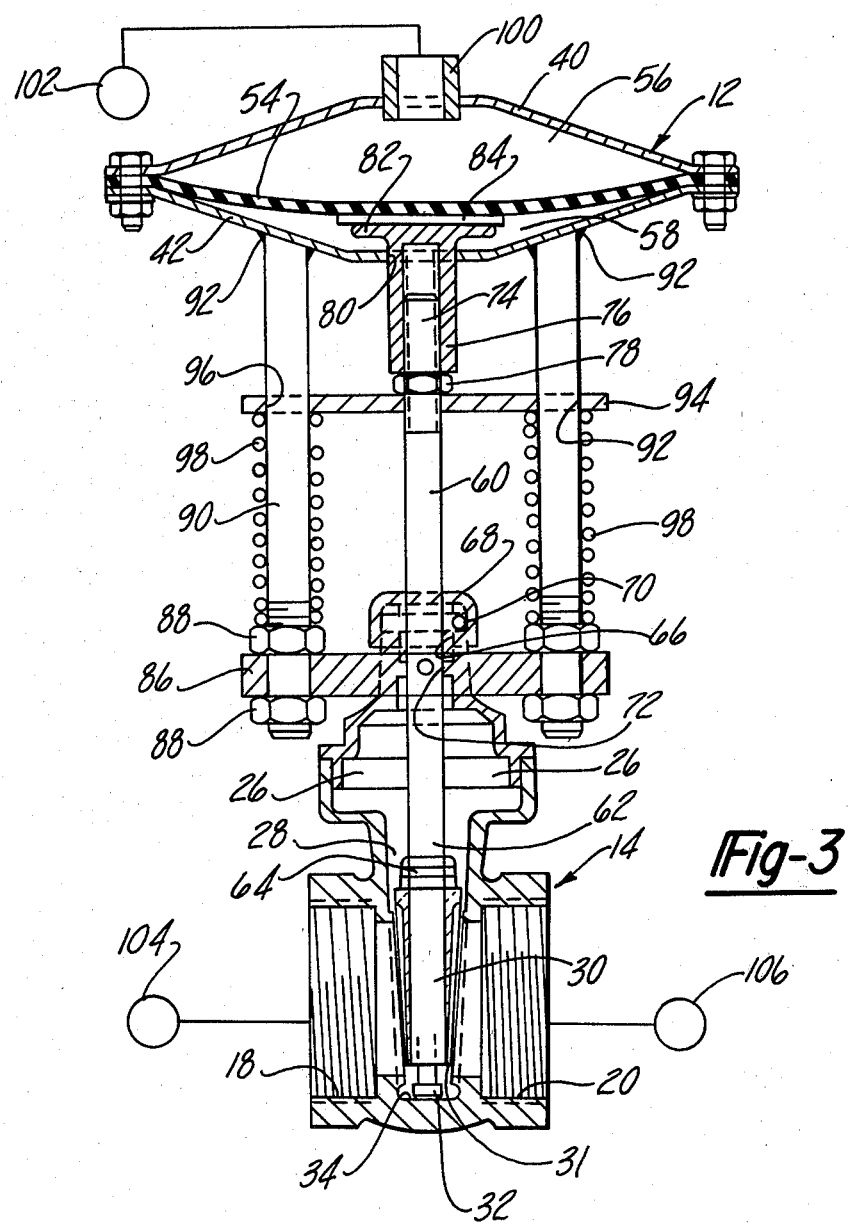
FIG. 3 is a longitudinal view similar to FIG. 2 but illustrating the valve in its closed position.

With reference first to FIGS. 1 and 2, a preferred embodiment of the valve assembly according to the present invention is thereshown and comprises a housing 10 having an upper housing part 12 and a lower housing part 14. The lower housing part 14 includes a fluid coupling 16 having an inlet 18, an outlet 20 and a fluid passageway 22 extending therebetween. The coupling inlet 18, outlet 20 and passageway 22 are aligned with each other and both the inlet 18 and outlet 20 are internally threaded for connection with conventional fluid fittings (not shown).

The lower housing part 14 also includes an upwardly extending section 24 which forms an open interior chamber 26 extending radially upwardly from the passageway 22. A slide channel 28 which is generally rectangular in cross sectional shape is formed in the lower housing part 14 between the chamber 26 and the passageway 22.

With reference particularly to FIGS. 2 and 3, a gate 30 having a free end 31 is slidably mounted within the guide channel 28 and movable between an open position, illustrated in FIG. 2, and a closed position, illustrated in FIG. 3. The sides of the gate 30 which face the inlet 18 and outlet 20 taper slightly inwardly towards its free end 31 and the gate 30 has a width sufficient to completely close the passageway 22 when the gate 30 is in its closed position (FIG. 3). A stop member 32 is secured to the free end 31 of the gate 30 and abuts against a recess 34 diametrically opposed from the guide channel 28 to limit the downward movement of the gate 30.

In its open position (FIG. 2), the gate 30 is at least partially retracted within the guide channel 28 so that at least a portion of the passageway 22 is open thus enabling fluid flow from the inlet 18 and to the outlet 20. Conversely, in its closed position (FIG. 3), the gate 30 extends across and bisects the passageway 22 thus blocking fluid flow from the inlet 18 and to the outlet 20.

With reference now particularly to FIGS. 1 and 2, the upper housing part 12 is constructed from an upper cover 40 and a lower cover 42. The covers 40 and 42 are both circular and concave in shape and are secured together around their outer peripheries by circumferentially spaced bolts 44 and nuts 46 so that the covers 40 and 42 face each other and form a chamber 48 therebetween. In addition, a circular flexible diaphragm 54 is entrapped between the outer peripheries of the covers which bisects the chamber 48 into an upper subchamber 56 and a lower subchamber 58. The sizes of the subchambers 56 and 58 will, of course, vary depending upon the position of the diaphragm 54.

With reference now particularly to FIG. 3, an elongated rod 60 is secured at its lower end 62 to the gate 30 in any conventional fashion, such as a pin 64. The rod 60 extends through the chamber 26 and an opening 66 in the lower housing part 14 and towards the upper housing part 12. A cap 68 with a packing 70 closes the open upper end 66 of the lower housing part 14 around the rod 60 to prevent fluid leakage along the rod 60 while still permitting the rod 60 to axially slide through the cap 68. In addition, a guide piece 72 is formed within the lower housing part 14 adjacent the cap 68 which frictionally engages the outer periphery of the rod 60 to maintain the alignment of the gate 30 as it slides between its open and closed positions.

The upper end 74 of the rod 60 is externally threaded and threadably engages a bushing 76 having an upper flanged end 82. A nut 78 is threaded onto the rod 60 and provides an adjustment of the connection between the rod 60 and the bushing 76. The bushing 76 slidably extends through a bore 80 in the lower cover 42 of the upper housing part 12. The flanged end 82 of the bushing 76 either abuts against or is attached to the center of the diaphragm 54 by a pad 84.

Still referring to FIG. 3, an elongated flat bracket 86 is secured at its center to the upper end of the lower housing part 14. A pair of elongated supports 90 are each secured at one end to the free ends of the bracket 86 by nuts 88 while the other ends of the supports 90 are secured to the upper housing part 12 by welds 92. The supports 90 thus extend and are secured between the upper housing part 12 and lower housing part 14.

Still referring to FIG. 3, an elongated second bracket 94 is slidably mounted at its center to the rod 60 beneath the nut 78. The bracket includes a bore 96 at each end which is also slidably mounted around the supports 90. As best shown in FIG. 1, the rod 60 and supports 90 are aligned with and generally parallel to each other.

A compression spring 98 is entrapped between the brackets 94 and 86 around each support 90 so that the brackets 86 and 94 function as spring retainers. Furthermore, the springs 98 are in a state of compression and, as such, urge the nut 78 and thus the rod 60 with its attached gate 30 towards its open position (FIG. 2).

With reference back to FIG. 3, a fluid fitting 100 is secured to the upper cover 40 of the upper housing part 12 so that the fluid fitting 100 is open to the subchamber 56. In use, the fitting 100 is fluidly connected to a source 102 of fluid pressure. Thus, when the fluid pressure of the source 102 exceeds a predetermined pressure level, the fluid pressure acting on the diaphragm 54 overcomes the force of the compression springs 98 and forces the gate 30 to its closed position (FIG. 3). Conversely, when the pressure at the fluid source 102 falls below the predetermined level the compression springs 98 overcome the force of the fluid pressure and move the gate 30 to its open position (FIG. 2).

In operation, the valve assembly according to the present invention has proven to be particularly suitable for use as a sewage or waste water dump valve. In such a configuration, the fluid fitting 100 is coupled to the inline fresh water pressure while the coupling inlet 18 is fluidly connected to a source of waste water 104 (FIG. 3). The outlet 20, in turn, is connected to a waste water dump line 106.

In normal operation, the inline water pressure is normally sufficient to overcome the force of the compression springs 98 thus holding the gate 30 in its closed position as shown in FIG. 3. In doing so, the gate 30 extends across the fluid passageway 22 between the inlet 18 and outlet 20 thus blocking any fluid flow from the waste water source 104 and to the dump line 106.

Conversely, in the event that the inline water pressure to the subchamber 56 falls below the predetermined level, the compression springs 98 overcome the force of the pressure in the subchamber 56 thus shifting the gate 30 to its open position as shown in FIG. 2. When this occurs, waste water from the source 104 can dump to the dump line 106 to eliminate the possibility of contamination of the fresh water source.

From the foregoing, it can be seen that the pressure responsive valve assembly according to the present invention is advantageous in that it is simple and yet durable and effective in operation. Furthermore, since the valve assembly contains relatively few moving parts, the necessary maintenance for the valve assembly is minimal.

A still further advantage of the valve assembly according to the present invention is that, due to the construction of the valve housing in which many parts of the valve assembly are exposed, maintenance and inspection of the valve assembly can be rapidly and inexpensively performed.

Having described my invention, however, many modifications thereto will become apparent to those skilled in the art to which it pertains without deviation from the spirit of the invention as defined by the scope of the appended claims.

I claim:

1. A valve assembly for use with an external pressure source, said valve assembly comprising a housing having a fluid coupling formed at one end, said fluid coupling having an inlet, an outlet and a fluid passageway extending therebetween, a gate slidably mounted in said housing and movable between a closed position in which said gate extends across said passageway and blocks fluid flow from said inlet and to said outlet and an open position in which said gate opens at least a portion of said passageway, means responsive to the external pressure source for moving said gate from said closed position to said open position only when the pressure at the pressure source falls below a predetermined level, wherein said moving means comprises an elongated rod secured at one end to said gate, a diaphragm, means for communicating said pressure source to one side of said diaphragm and wherein the other end of the rod abuts against the other side of the diaphragm, and resilient means for urging said gate towards said open position, wherein said housing comprises an upper part defining a chamber in which said diaphragm is contained, a lower part which includes said coupling, and at least two elongated supports extending between and secured to said housing parts, wherein said moving means further comprises a first spring retainer secured to said lower housing part and a second spring retainer secured to said rod and axially slidably mounted to said supports, and wherein said resilient means comprises a pair of compression springs, one compression spring being disposed around each support and entrapped between said spring retainers, wherein said rod and said supports are substantially aligned and parallel to each other and wherein each spring retainer comprises an elongated flat bracket, and wherein said lower housing part includes an annular, reduced diameter upper portion formed around said rod, and said first spring retainer bracket includes an aperture adapted to receive said upper portion of said lower housing to prevent excentric application of forces by said springs on said lower housing.

2. The invention as defined in claim 1 and further comprising means for sealing said rod to said lower housing part while permitting axial movement of said rod.

3. The invention as defined in claim 1 wherein said upper housing part comprises a pair of circular and concave covers, means for securing the outer periphery of said covers together in a facing relationship thus forming said chamber and wherein the outer periphery of said diaphragm is entrapped between the outer peripheries of said covers.

4. The invention a defined in claim 1 wherein said inlet is connected to a source of waste water, said outlet is connected to a waste water dump line and said pressure source comprises a pressurized fresh water source.

* * * * *